United States Patent [19]

Okada

[11] Patent Number: 5,022,641
[45] Date of Patent: Jun. 11, 1991

[54] RECIRCULATING FEEDER OF SHEETS

[75] Inventor: Naofumi Okada, Tenri, Japan

[73] Assignee: Sharp Kabushiki Kaisha, Osaka, Japan

[21] Appl. No.: 469,206

[22] Filed: Jan. 24, 1990

[30] Foreign Application Priority Data

Jan. 31, 1989 [JP] Japan .................................. 1-23396

[51] Int. Cl.[5] ............................................. B65H 5/22
[52] U.S. Cl. ..................................... 271/3.1; 271/163; 271/212; 271/213
[58] Field of Search ..................... 271/3.1, 4, 5, 11, 97, 271/98, 207, 222, 220, 163, 212, 213

[56] References Cited

U.S. PATENT DOCUMENTS

| | | | |
|---|---|---|---|
| 4,304,782 | 5/1983 | Acquaviva | 271/3.1 |
| 4,413,901 | 11/1983 | Kollar | 271/3.1 |
| 4,560,158 | 12/1985 | Wilson | 271/3.1 |
| 4,786,039 | 11/1988 | Ito | 271/3.1 |

FOREIGN PATENT DOCUMENTS 48104 4/1981 Japan .................................. 271/212

OTHER PUBLICATIONS

Alberte, Andrews, Document Restack Pneumatic Control Mar./Apr. 1982, p. 73, Xerox Technical Disclosure, vol. 7, No. 2.
L. A. Walker, Cam-Lifting Device, Apr. 1981, p. 4832, IBM Technical Disclosure Bulletin, vol. 23, No. 11.

Primary Examiner—H. Grant Skaggs
Assistant Examiner—C. Druzbick

[57] ABSTRACT

In a recirculating feeder of sheets, the sheets are supplied and restored by the top-pick bottom-return method from a storing device in which the sheets are stacked and stored. The sheets are restored in the lowermost position in the stacking direction of the stacked sheets and stored in the storing device through a driving member, a first restoring device and a second restoring device. The driving member is controlled so as to approach/depart from the first restoring device, and when the sheet is conveyed into the storing device, it approaches to intervene between the lowermost position in the stacking direction of the sheets and the first restoring device, thereby pinching the sheet together with the first restoring device. In this way, the conveying force of the first restoring device is securely transmitted to the sheet, and repelling and mixing are avoided. The driving member contains defining members, which are intended to match the sheet stacking. When the sheet is conveyed to the second restoring device, the driving member is departed. The second restoring device is controlled so as to intermittently contact with or depart from the sheet after the first restoring device, and conveys the sheet up to the final storing position. Thus, without lack of the conveying force, the sheet is securely restored, and soiling of the sheet is lessened by the intermittent contact.

9 Claims, 15 Drawing Sheets

Fig. 2 Prior Art (1)
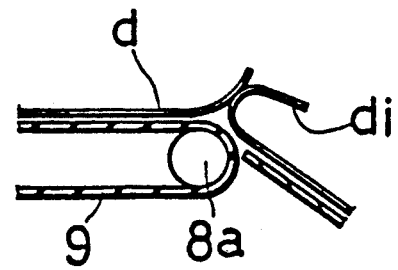
Fig. 2 Prior Art (2)
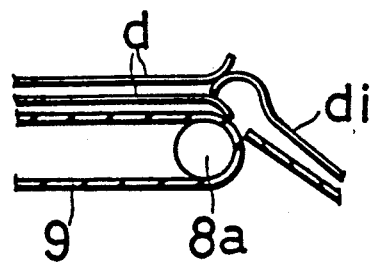
Fig. 2 Prior Art (3)
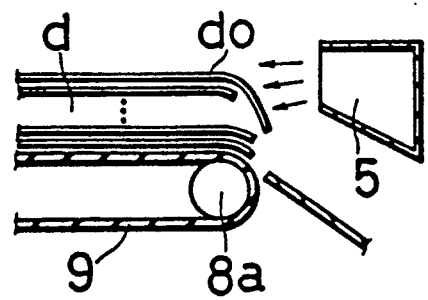

RECIRCULATING FEEDER OF SHEETS

BACKGROUND OF THE INVENTION

1. Field of the Invention

The present invention relates to a recirculating feeder of sheets, in which sheets are supplied from a storing means in which sheets are stacked and stored, and the sheets after being supplied are put back to the storing means again, and more particularly to a recirculating feeder of sheets in a so-called top-pick bottom-return structure in which sheets are supplied from above the stacking direction in the storing means and returned from beneath the stacking direction, which may be favorably applied in a recirculating automatic document feeder (RADF) for conveying the sheet originals sequentially into the exposure region one by one in, for example, an electrostatic copying apparatus.

2. Description of the Prior Art

In an electrostatic copying apparatus, for example, when copying documents in a plurality of sheets, the RADF tends to be installed in order to save the operator's labor of putting the sheets one by one on the original platen. Such RADF conveys the plural sheet originals sequentially to the exposure region having a exposure means in synchronism with the copying action of the electrostatic copying apparatus main body, and realizes the function of, for example, copying duplex originals having images formed on both sides of the sheet on both sides of copying papers, in collaboration with the copying apparatus main body.

Such RADF is provided with a storing means for stacking and storing sheet originals to be copied. Around this storing means there are, among others, a paper feed means for feeding the originals stored in the storing means and starting conveying to the exposure region, and a returning means for returning the originals after exposure in the exposure region back to the storing means. The storing means, and the paper feed means and the returning means around the storing means are collectively called a recirculating original feeding means.

FIG. 1 is a sectional view showing a simplified structure of a typical conventional recirculating original feeding means 1. As stated above, the recirculating original feeding means 1 comprises a storing means 2 for stacking and storing the documents d to be copied, a paper feed means 3 disposed above and at the right side of the storing means 2 in FIG. 1, and a returning means 4 disposed beneath and at the right side of the storing means 2, being composed in a so-called top-pick bottom-return structure.

Hitherto, various structures have been proposed for the paper feed means 3, and the paper feed means 3 in FIG. 3 shows one of these examples. Toward the entire surface of the downstream end in the paper feed direction of the documents d stacked in the storing means 2, air is blown from an exhaust duct 5, and the downstream end in the paper feed direction of the documents d is separated by the air layer. Of the separated documents d, the document d0 at the uppermost position in the stacking direction is sucked and conveyed by a suction conveying means 6 installed above the document d0. The suction conveying means 6 is composed of an endless belt 6c, which possesses innumerable openings and is mounted on two rollers 6a, 6b, and an intake duct 6d disposed at the inner side of the belt 6c. By an intake means which is not shown, when the upper side air of the storing means 2 is sucked in from the openings in the intake duct 6b and the openings of the endless belt 6c, the document d0 at the uppermost position in the stacking direction is attracted to the outer circumference of the endless belt 6c, and is conveyed into a conveying roller 7, and conveyance is started toward the conveying route which is not shown. By the exhaust from the exhaust duct 5, only the separated uppermost document d0 is sucked and conveyed, so that the documents may be supplied into the conveying route securely one by one.

Incidentally, the returning means 4 comprises, for example, rollers 8a, 8b, and an endless belt 9 mounted on the rollers 8a, 8b. This endless belt 9 also serves as the bottom of the storing means 2, and supports the stacked documents d. In the exposure region which is not shown, after the copied document di passes through a conveying route 10, the rollers 8a, 8b are driven to rotate the endless belt 9 in the direction of arrow 13, and the document di is inserted into the lowermost position in the stacking direction of the documents d stacked and stored in the storing means 2. The inserted document di is pressed to the belt 9 by the weight of the documents d being stacked, and is conveyed by the frictional force. The returning means 4 is designed so that the downstream end in the returning direction of the returning document di may be conveyed until reaching a side aligning piece 11 composing the side portion of the storing means 2.

In such construction of the recirculating original feeding means 1, however, the following problems occur. FIG. 2 is a diagram showing the state of the documents d as a problem of the prior art. That is, in the composition of the recirculating original feeding means 1, the documents d are stored in the storing means 2 in such a manner that the vicinity of the upstream side end portion of the returning direction of the documents d may be located in overlap with the returning start point of the returning means 4. In particular, when the exhaust duct 5 is used in the paper feed means 3, air is blown to the lower side by the draft from the exhaust duct 5, in the vicinity of the upstream end in the returning direction of the documents at the lower side of the stacking direction of the stacked documents d. In other words, the vicinity of the upstream end in the returning direction of the documents d stored in the storing means 2 tends to droop into the direction of the conveying route 10 as shown in FIG. 1.

When the document di is returned from the conveying route 10 into the storing means 2 in such state, the vicinity of the upstream end in the returning direction of the documents d in the storing means 2 and the downstream end in the conveying direction of the conveyed document di may collide with each other, and the documents may repel each other, so-called repelling, as shown in FIG. 2 (1), or the returning document may be inserted into an intermediate position, instead of the lowermost position in the stacking direction of the documents d stacked and stored in the storing means 2, so-called mixing, as shown in FIG. 2 (2), thereby causing disorder of documents. When such problems should occur, the conveyed document di is parted from the returning means 4, and is not securely put back into the storing means 2, which may lead to so-called paper jamming.

Besides, when only few documents, for example, two or three are stored in the storing means, as the total weight of the documents to press down the document di conveyed to the belt 9 of the returning means 4 is light, the conveying force (frictional force) of the belt 9 is not transmitted to the document di, so that the document di may not be returned securely until the downstream end in the returning direction of the document di reaches the side end portion 11a of the side aligning piece 11.

Incidentally, in the case of the belt 9 made of rubber or the like, since the frictional force is utilized when returning the document di, static electricity is likely to be generated, and dust particles are likely to stick on the surrounding surfaces. Therefore, such dust deposit may be rubbed against the belt side surface of the document di in the returning step as the belt surface abuts against, so that the document may be stained.

Furthermore, as stated above, when the state of failure of conveyance of the document di up to the side aligning piece continues due to insufficient conveying force, the matching is inferior at the upstream end in the returning direction of the stacked documents d, and the ends are not aligned. In FIG. 1, the upstream end in the returning direction and the downstream end in the paper feed direction are identical, and the air from the exhaust duct 5 is blown against the downstream end in the paper feed direction. Therefore, when the upstream end in the returning direction is misaligned, the air from the exhaust duct 5 is not uniformly blown to the downstream end in the paper feed direction, so that the documents d may not be uniformly separated by the air layer. As a result, as shown in FIG. 2 (3), the document d0 in the uppermost position in the stacking direction is pushed against the documents d side, and the document d0 may not be conveyed by the suction conveying means or supplied obliquely (that is, the paper feed direction and the downstream end in the paper feed direction of documents are not at a right angle).

SUMMARY OF THE INVENTION

It is hence a primary object of the invention to present a recirculating feeder of sheets capable of restoring the sheets securely without soiling and feeding securely, and further enhancing the grade.

In order to achieve the above object, the invention presents a recirculating feeder of sheets which possesses storing means in which sheets are stacked and stored, for supplying the sheets from the upper side in the stacking direction and restoring the sheets supplied from the downstream side in the stacking direction, comprising:

restoring means being disposed near the lower end in the stacking direction of the storing means in the vicinity of the upstream side end in the restoring direction of the storing means from conveying the sheets into the storing means when returning, and a driving member being disposed at the upstream side in the restoring direction, relating to the restoring means, being set closer above the stacking direction of the restoring means in the period when the sheet is close to the restoring means when restoring the sheets, and remoter in the other period.

Also the invention presents a recirculating feeder of sheets which possesses storing means in which sheets are stacked up and stored, for supplying the sheets from the upper side in the stacking direction and restoring the sheets supplied from the downstream side in the stacking direction, comprising:

first restoring means being disposed near the lower end in the stacking direction of the storing means in the vicinity of the upstream side end in the restoring direction of the storing means for conveying the sheets into the storing means when returning, a driving member being disposed at the upstream side in the restoring direction, relating to the first restoring means, being set closer above the stacking direction of the first restoring means in the period when the sheet is close to the first restoring means when restoring the sheets, and remoter in the other period, and second restoring means being disposed at the downstream side in the restoring direction, relating to the first restoring means, for intermittently contacting/departing to and from the sheets when restoring the sheets, and conveying the sheets to the downstream side in the restoring direction when contacting.

In a preferred embodiment, the driving member possesses a defining member which projects to the upper side in the stacking direction of sheets, and presses the upstream side end portion in the restoring direction of sheets stacked in the storing means when approaching to the first restoring means.

In a further preferred embodiment, the first restoring means is composed of a roller.

In a different preferred embodiment, the driving member comprises:

a rotatable lever piece, a drive unit for rotating and driving the lever piece, and a plate part which slides depending on the rotation of the lever piece and is inserted between the sheet and the first restoring means when approaching to the first restoring means.

In another preferred embodiment, a detecting means for detecting the sheets conveyed into the first restoring means is provided, and the driving member responds to the output from the detecting means, and moves closer to the first restoring means while the detecting means is detecting the sheet, and moves away from the first restoring means while the detecting means is not detecting the sheet.

In other preferred embodiment, the second restoring means comprises:

a receiving member having a horizontal support surface for receiving sheets, and a hole for projection extending along the conveying direction, a pair of rotating pieces being disposed rotatably around a horizontal rotary axial line beneath the receiving member, arranged with a spacing along the conveying direction, in which the outer circumference of each rotating piece possesses a first portion longer in the distance from the rotary axial line and a second portion shorter in the distance from the rotary axial line that in the first portion, and the shape of the outer circumference of each rotating piece is the same, a belt applied on the pair of the rotating pieces and which is able to project upward from the hole for projection, and driving means for rotating and driving the pair of rotating pieces in synchronism, thereby moving the outer circumference of the belt higher than the support surface when the first portion of each rotating piece is positioned at the same time higher than the rotary axial line, and moving the outer circumference of the belt lower than the support surface when the second portion of each rotating piece is positioned at the same time higher than the rotary axial line.

In a further different preferred embodiment, the first portion is an arc possessing a uniform radius along the predetermined circumferential range about the rotary axial line in the shape of the outer circumference of the section at right angle to the axis of the rotating piece.

In a still different preferred embodiment, the circumferential length forming the arc of the rotating piece is selected as an integer fraction of the distance necessary for conveying the sheets in the storing means.

The invention moreover presents a recirculating feeder of sheets which possesses storing means in which sheets are stacked and stored, for supplying the sheets from the upper side in the stacking direction and restoring the sheets supplied from the downstream side in the stacking direction, comprising:

first restoring means being disposed near the lower end in the stacking direction of the storing means in the vicinity of the upstream side end in the restoring direction of the storing means for conveying the sheets into the storing means when returning, a driving member being disposed at the upstream side in the restoring direction, relating to the first restoring means, being set closer above the stacking direction of the first restoring means in the period when the sheet is close to the first restoring means when restoring the sheets, and remoter in the other period, in which a defining member is formed so as to project to the upper side in the stacking direction and press the upstream side end portion in the restoring direction of the sheets stacked in the storing means when approaching, and second restoring means being disposed at the downstream side in the restoring direction, relating to the first restoring means, so as to convey the sheets to the downstream side in the restoring direction when restoring the sheets.

According to the recirculating feeder of sheets of the invention, it possesses the storing means in which sheets are stacked and stored, the sheet is supplied from the upper side in the stacking direction, and the supplied sheet is restored from the lower side in the stacking direction. In the vicinity of the upstream side end portion in the restoring direction of the storing means, near the lower end portion in the stacking direction of the storing means, the first restoring means is installed, and at the upstream side in the restoring direction relating to the first restoring means, the driving member is disposed, and at the downstream side in the restoring direction relating to the first restoring means, the second restoring means is installed.

The sheet is conveyed into the storing means by the first restoring means. When the sheet is restored into the storing means by the first restoring means, while the sheet is approaching the first restoring means as being detected by the detecting means, the driving member is at the lower side in the stacking direction of the stacked sheets, and approaches upward in the stacking direction of the first restoring means. Therefore, the conveyed sheet is securely inserted into the lowermost position of the stacked sheets. Moreover, the sheet is pinched by the driving member and the first restoring means, thereby causing the conveying force of the first restoring means to be transmitted, and the sheet is restored into the storing means. On the other hand, in the remaining period while the sheet is not approaching the first restoring means, the driving member is departed and is waiting.

The sheet conveyed into the storing means by the first restoring means is further conveyed within the storing means by the second restoring means. The second restoring means is composed by including, among others, the belt applied on a pair of deformed rotating pieces, and intermittently contacts with or departs from the sheet being restored. When contacting, the conveying force is securely transmitted to the sheet, thereby causing the sheet to be further conveyed to the downstream side in the restoring direction. Therefore, the sheet will not stop in the midst of returning due to insufficient conveying force within the storing means. Besides, since the second restoring means intermittently contacts the sheet, the risk of rubbing the dust deposit on the second restoring means against the sheet is reduced, and soiling of the sheets may be outstandingly decreased.

Still more, according to the recirculating feeder of sheets of the invention, the defining member projecting upward in the stacking direction is formed on the driving member. By this defining means, when the driving member approaches, the upstream side end portion in the restoring direction of the sheet stacked in the storing means is pressed and defined, and therefore it is possible to feed securely from the upper side in the stacking direction of the sheets, thereby avoiding oblique deviation of the supplied sheet or failure of supply. Incidentally, in order to obtain the effect produced by the defining means, it is not required to design the second restoring means to intermittently contact or depart with or from the sheets.

According to the invention, by installing the driving member, the restoring side end portion of the already stored sheet may be entirely separated from the restoring means. Therefore, the downstream side end portion in the restoring direction of the sheet being conveyed so as to be restored and the upstream side end portion in the restoring direction of the already stored sheet do not collide against each other, so that undesired states such as repelling and mixing may not take place.

Furthermore, since the driving means pinches the sheet to be restored together with the first restoring means, the conveying force of the first restoring means is securely transmitted to the sheet. Hence, stopping of conveying due to insufficient conveying force does not occur.

Moreover, by installing the second restoring means, the restored sheet can be conveyed securely to the predetermined position without stopping on the way. Besides, since the second restoring means transmits the conveying force to the sheet to be conveyed intermittently, rubbing of dusts deposits against the sheet is reduced, and soiling of the sheet is decreased.

In addition the invention, by forming the defining member on the driving member, the upstream side end portions in the restoring direction of the sheets already stacked and stored when driving the driving member are defined and aligned. Therefore, the paper may be fed precisely. Consequently, the grade of the recirculating feeder of sheets is further enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention, as well as the features and advantages thereof, will be better understood and appreciated from the following detailed description taken in conjunction with the drawings which are given by way of illustration only, and thus are not limitative of the present invention, and in which:

FIG. 2 is a sectional view showing problems for documents d one of the conventional feeding means;

DETAILED DESCRIPTION OF THE PREFERRED EMBODIMENTS

Figure 1:
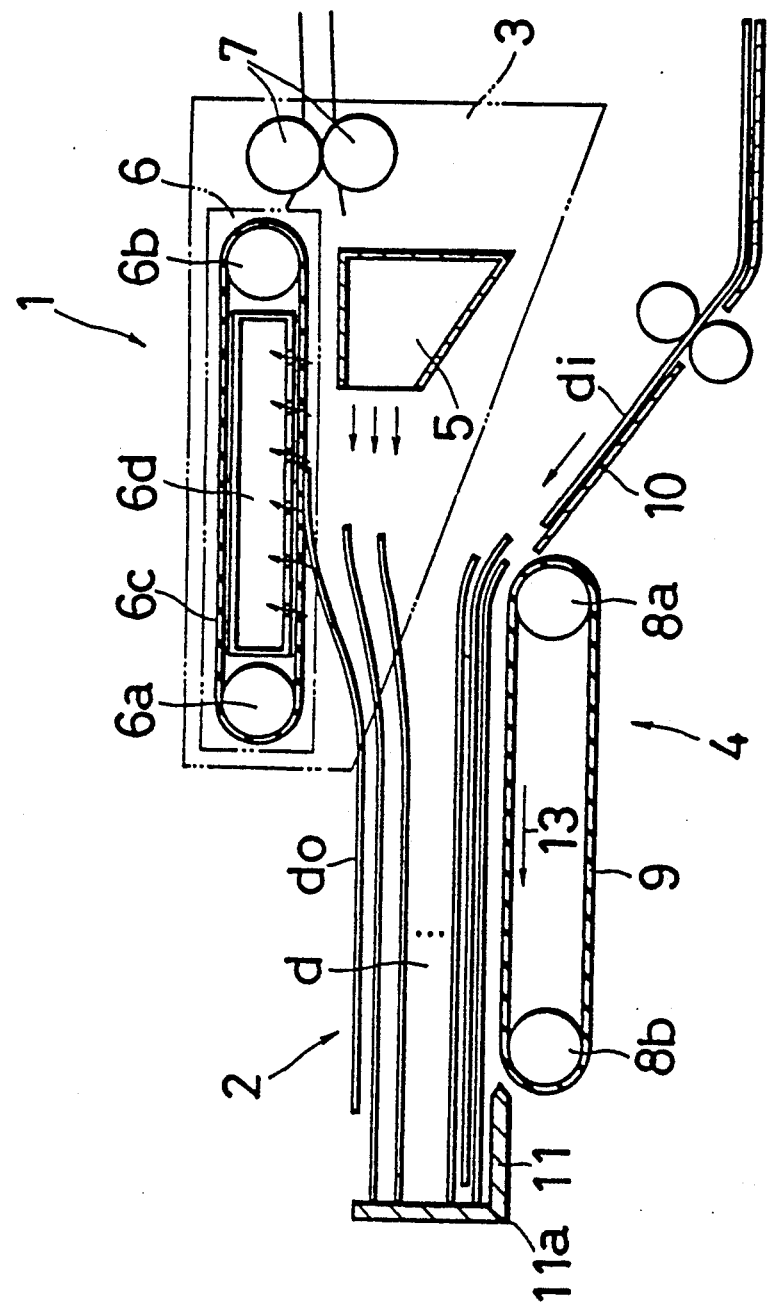
FIG. 1 is a sectional view showing a simplified structure of a typical conventional recirculating original feeding means 1.

Referring now to the drawings, some of the preferred embodiments are described in detail below.

A recirculating feeder of sheets of the invention is installed, for example, in an electrostatic copying apparatus. For instance, in the RADF for automatically conveying the sheet originals one by one into the exposure region to be exposed, the recirculating original feeding means 20 feeds the document to be copied and restores them after the exposure process.

Figure 3:
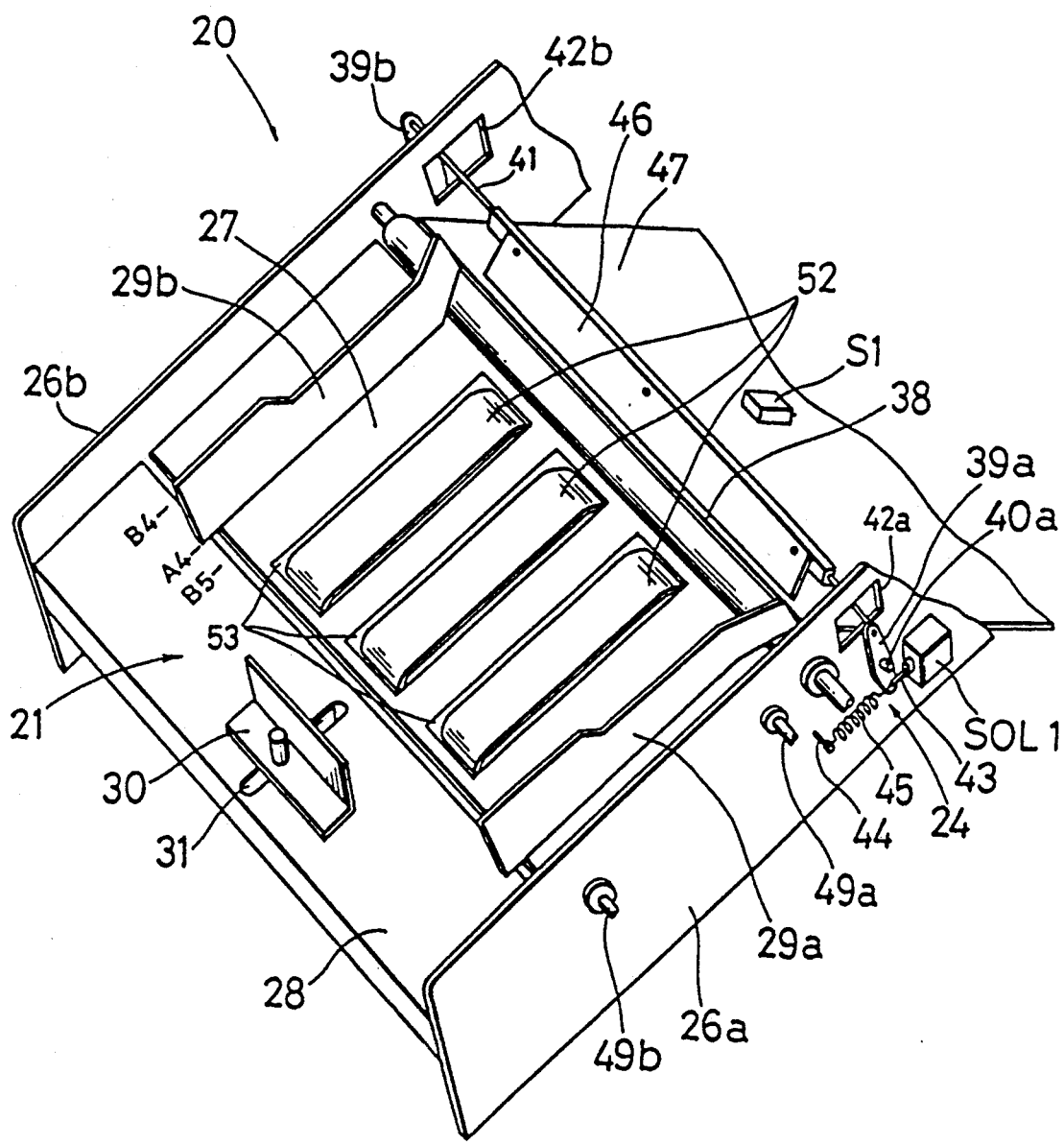
FIG. 3 is a perspective view showing a simplified structure of the recirculating original feeding means 20 in one of the embodiments of the present invention.
Figure 4:
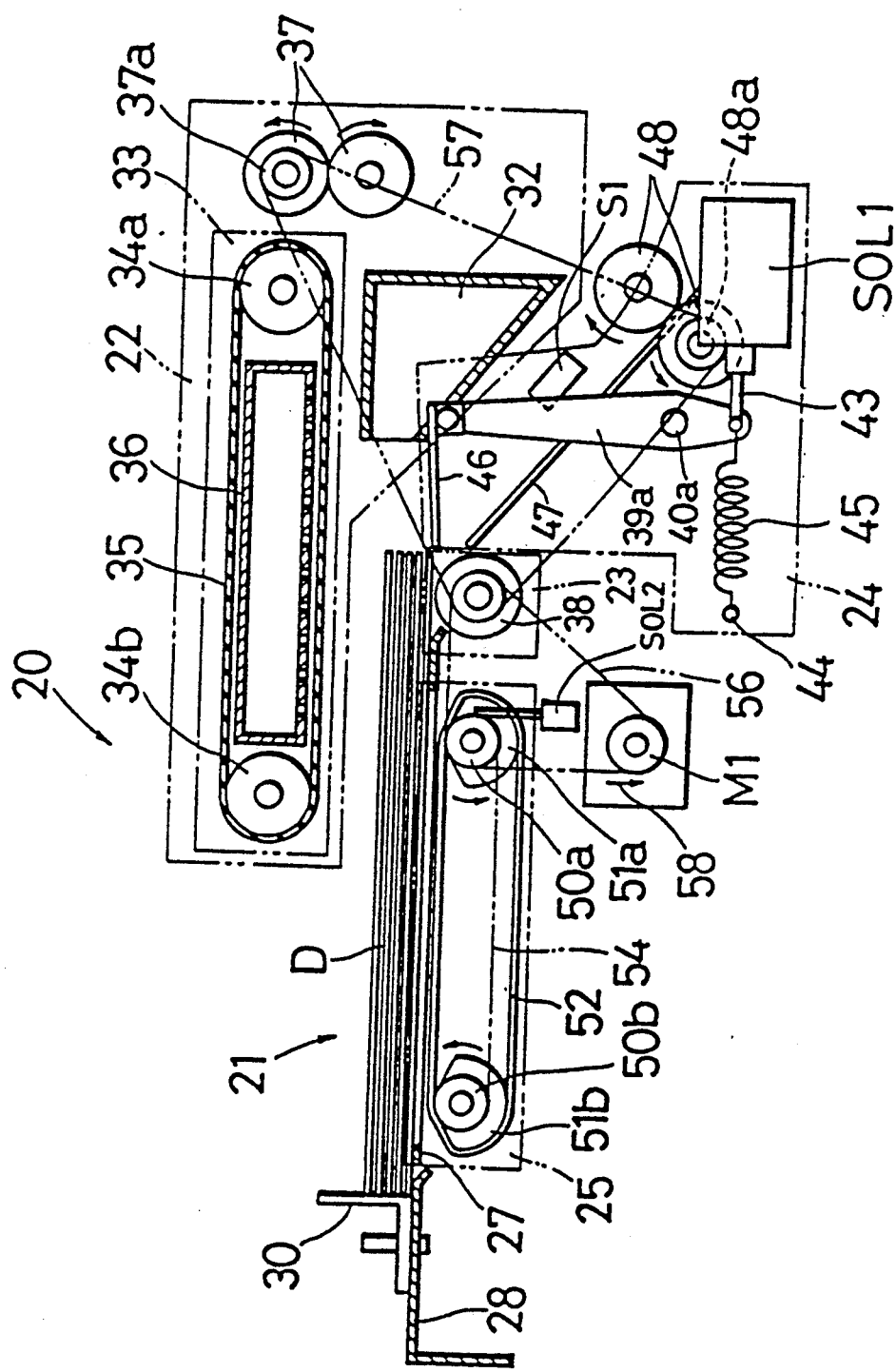
FIG. 4 is a sectional view showing a simplified structure of the recirculating document feeding means 20.

FIG. 3 is a perspective view showing a simplified structure of the recirculating original feeding means 20 in one of the embodiments of the invention, and FIG. 4 is a sectional view showing a simplified structure of the recirculating original feeding means 20. The recirculating original feeding means 20 comprises a storing means 21 in which the documents to be copied are stacked and stored, a paper feeding means 22 disposed at the vertical upper side of the storing means 21 for feeding the documents in the storing means 21, a first restoring means 23 for restoring the document supplied by the paper feeding means 22 into the storing means 21, a driving member 24 disposed at the upstream side in the restoring direction of the documents in relation to the first restoring means 23 so as to be free to approach to or depart from the first restoring means 23, and a second restoring means 25 disposed at the vertical lower side of the storing means 21 and at the downstream side in the restoring direction of the documents in relation to the first restoring means 23.

The outer wall of storing means 21 includes the side surfaces 26a, 26b, and bottom surfaces 27, 28 which are support surfaces for supporting the documents D being stored in the stack. On one bottom surface 27, matching plates 29a, 29b are disposed in order to match the stacked documents D in the widthwise direction (the vertical direction to the sheet of paper of FIG. 4). The matching plates 29a, 29b are set for example, on the basis of the side index indicated in the other bottom surface 28, according to the size of the documents D to be stored, and the documents D are stored therein. On the other bottom surface 28, there is a side aligning piece 30, and the flat part of the side aligning piece 30 extending vertically to the bottom surface 28 is fixed so as to abut against the entire surface of the downstream end in the restoring direction of the documents D to be stored in the stack. Such fixing is achieved by passing a bolt projecting from the bottom of the side aligning piece 30 through a penetration hole 31 formed in the bottom surface 28, and fastening it with a nut at the back side of the bottom surface 28.

Hereinafter, in the description of the invention, the documents stacked in the storing means 21 are represented by the reference code D, and the document being supplied and conveyed from the storing means 21 is indicated by Di.

The paper feeding means 22 comprises, for example as shown in FIG. 4, an exhaust duct 32 and a suction conveying means 33. The suction conveying means 33 is disposed at the upper side in the stacking direction (the vertical direction in FIG. 4) in relation to the stacked documents D, and is composed of an endless belt 35 which is stretched between two rollers 34a, 34b having innumerable openings, and an intake means including an intake duct 36 formed at the inner side of the endless belt 35. By this suction conveying means 33, the uppermost document in the stacking direction of the stacked documents D is sucked and conveyed as described later, and the conveyance through conveying roller 37 up to a conveying route stated below is started. Incidentally, the paper feeding means 22 uses the suction conveying means in FIG. 2, but the composition of the paper feeding means is not limited in the invention, and the paper feeding means may be composed of, for example, a paper feed roller abutting against the uppermost position of the stacked documents D, and a pair of handling rollers mutually rotating in the same direction and having outer circumferences differing in the frictional force.

The first restoring means 23 is composed of, for example, a single roller 38. This roller 38 is disposed near the upstream side end portion in the restoring direction of the storing means 21, and near the lower end portion in the stacking direction of the storing means 21, that is, at the right side lower end portion of the storing means 21 in FIG. 4.

In the driving member 24, lever pieces 39a, 39b having identical shape are respectively disposed outside of the side surfaces 26a, 26b forming the side parts of the storing means 21. Fulcrums 40a, 40b formed at positions deviated from the center of the lever pieces are respectively pinned to the side surfaces 26a, 26b, and the lever pieces 39a, 39b are rotatably provided. In the lever piece 39 a shaft part 41 is pivoted at one end at the major axis side from the fulcrum 40. In other words, by the shaft part 41 penetrating through the openings 42a, 42b respectively formed in the side surfaces 26a, 26b, the lever pieces 39a, 39b are coupled together. Besides, in one lever piece 39a, the other end portion at the minor axis side from the fulcrum 40a is coupled with a moving piece 43 of an adjacent solenoid SOL1, and a spring 45 is stretched between the same other end portion and a fixing piece 44 fixed at an adjoining position.

At the shaft part 41, a plate part 46 is disposed so as to be rotatable about the shaft part 41. In the plate part 46, the side end portion remote from the shaft part 41, that is, the end portion opposite the storing means 21 is formed so as to be parallel to the rotary axis of the roller 38 which is the first restoring means 23. This end portion is freely slidable, by driving of the lever piece as stated below, on the flat plane of the guide plate 47 for guiding the document to be restored into the roller 38, and when at least the plate part 46 approaches the roller 38 most closely, one surface of the plate part 46 (the lower side in FIG. 4) abuts against the outer circumference of the roller 38.

Moreover, above the guide plate 47 for guiding the document Di, a photo detector S1 of, for example, a reflective type is disposed. The detection signal of the photo detector S1 judges whether or not the document Di is conveyed into the guide plate 47 through a conveying roller 48, and serves as a control signal for controlling the driving of the driving member 24.

On the other hand, in the second restoring means 25, on the rotary shafts 49a, 49b on which small rollers 50a, 50b are formed, there are a pair of cam-shaped rollers 51a, 51b, which are plural this embodiment), respectively formed in semicircular shapes, that is, in arc forms having a uniform radius in the predetermined circumferential range about the rotary axial line, and endless belts 52 are applied individually on the mutually confronting cam-shaped rollers 51a, 51b. These cam-shaped rollers 51a, 51b are rotating pieces, and the endless belt 52 is stretched so as to face the deformed outer circumferential surfaces of the cam-shaped rollers 51a, 51b mutually in identical direction and to rotate as shown in FIG. 4. In the bottom surface 27 of the storing means 21, openings 53 as the holes for projection are formed as many as the number of endless belts 52, and the cam-shaped rollers 51 and endless belts 52 are arranged so that the outer circumference of the belt is opposite to the lower side of the document D at the lowermost position in the stacking direction of the documents D stored in stack, through these hole openings 53. A belt 54 is also applied between the smaller rollers 50a, 50b, and by rotating these small rollers 50a, 50b, the cam-shaped rollers 51a, 51b are rotated, so that the endless belts 52 convey the document as stated below.

Near the recirculating original feeding means 20, a roller driving motor M1 is installed, and an endless belt 56 is stretched over the rotary shaft of the motor M1, the rotary shaft of the roller 38, and the one rotary shaft 49a of the second restoring means 25. Another endless belt 57 is stretched over the rotary shaft of the roller 38, the one rotary shaft 37a of the conveying roller 37 for starting conveyance of the document into the conveying route, and the one rotary shaft 48a of the conveying roller 48 for guiding the document to the guide plate 47. Therefore, by rotating the roller driving motor M1 in the direction of arrow 58, the rollers on which the belts are applied and the driven rollers are revolved in the direction of the arrow indicated closely in FIG. 2. Meanwhile, in the second restoring means 25, a rotating force is always transmitted to the rotary shaft 49a by the motor M1, but a clutch CLT1 and a solenoid SOL2 are disposed as described below between the rotary shaft 49a and the rotary shaft of the small roller 50a, and the clutch CLT1 is coupled only for a predetermined period to excite the solenoid SOL2, so that the cam-shaped roller 51a is revolved as stated below.

Figure 5:
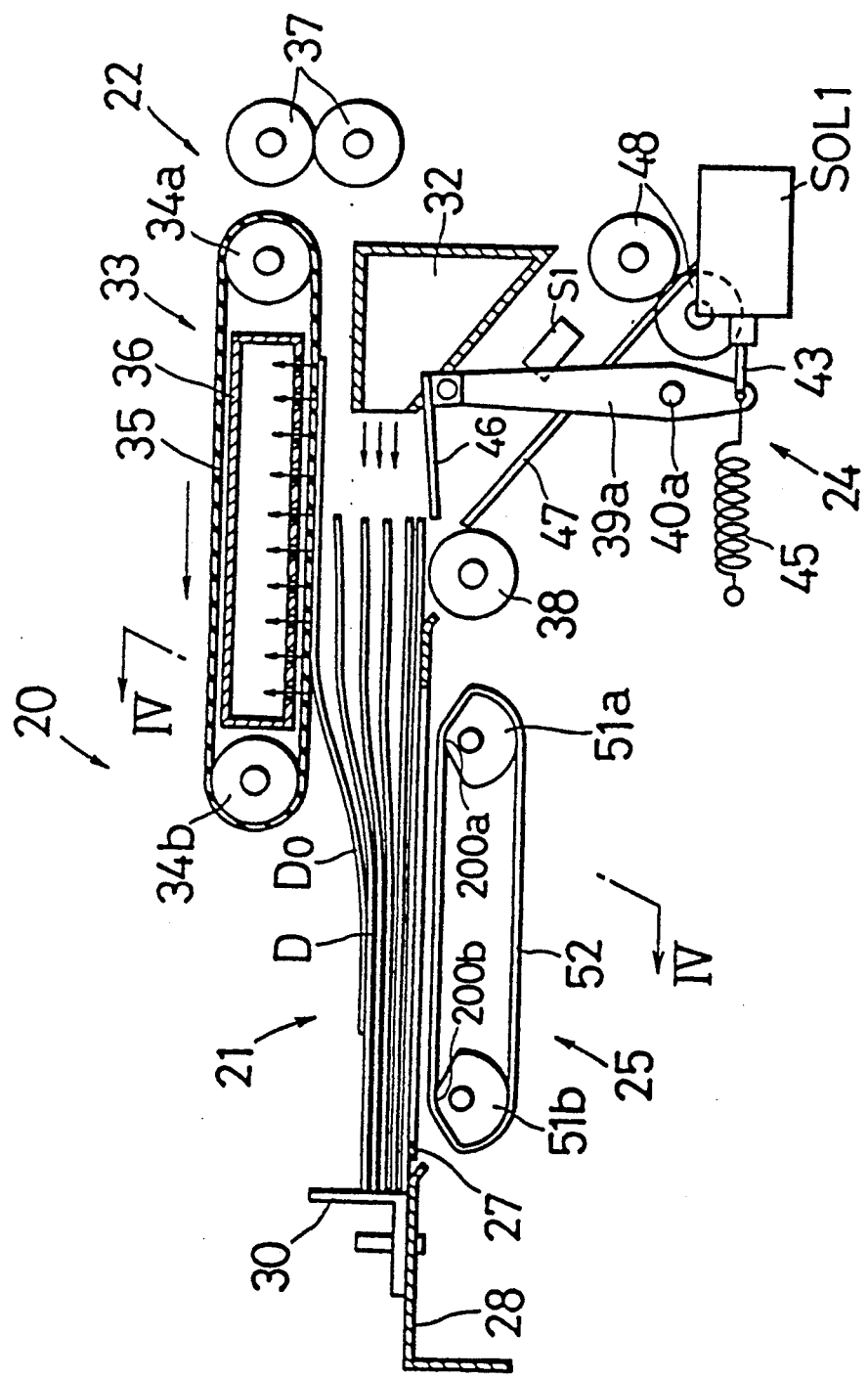
FIG. 5 is a sectional view showing the operation of paper feed of document D in the recirculating original feeding means 20.
Figure 6:
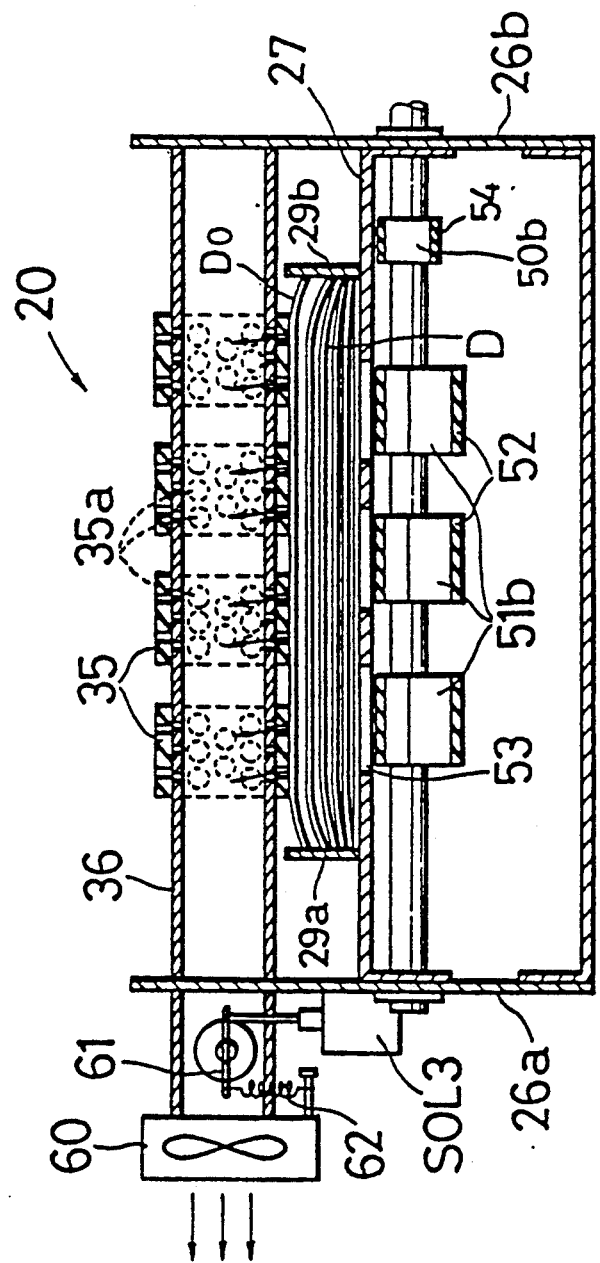
FIG. 6 is a sectional view seen from sectional line IV—IV in FIG. 5.
Figure 7:
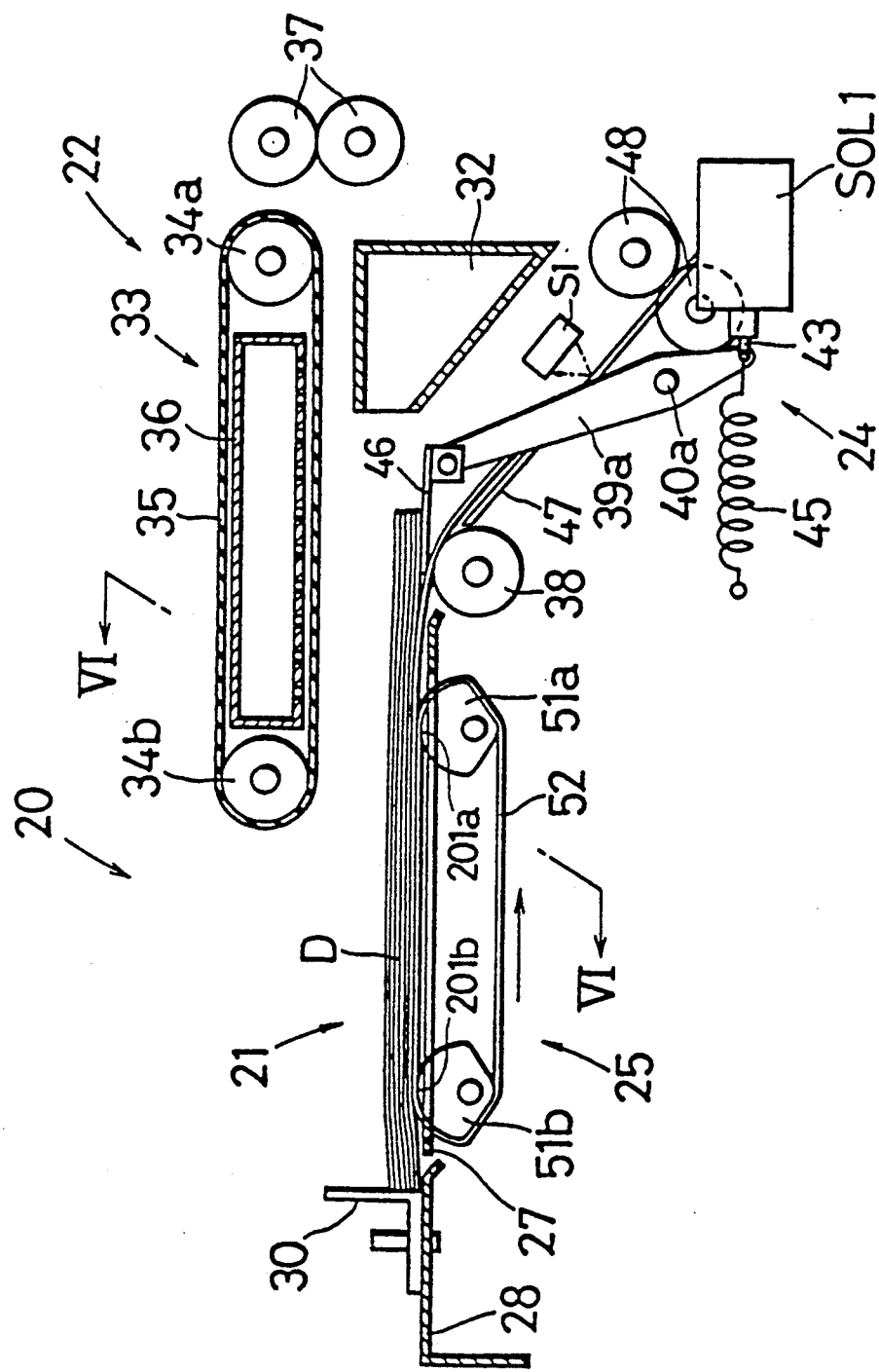
FIG. 7 is a sectional view for explaining the restoring operation of the documents D in the recirculating original feeding means 20.
Figure 8:
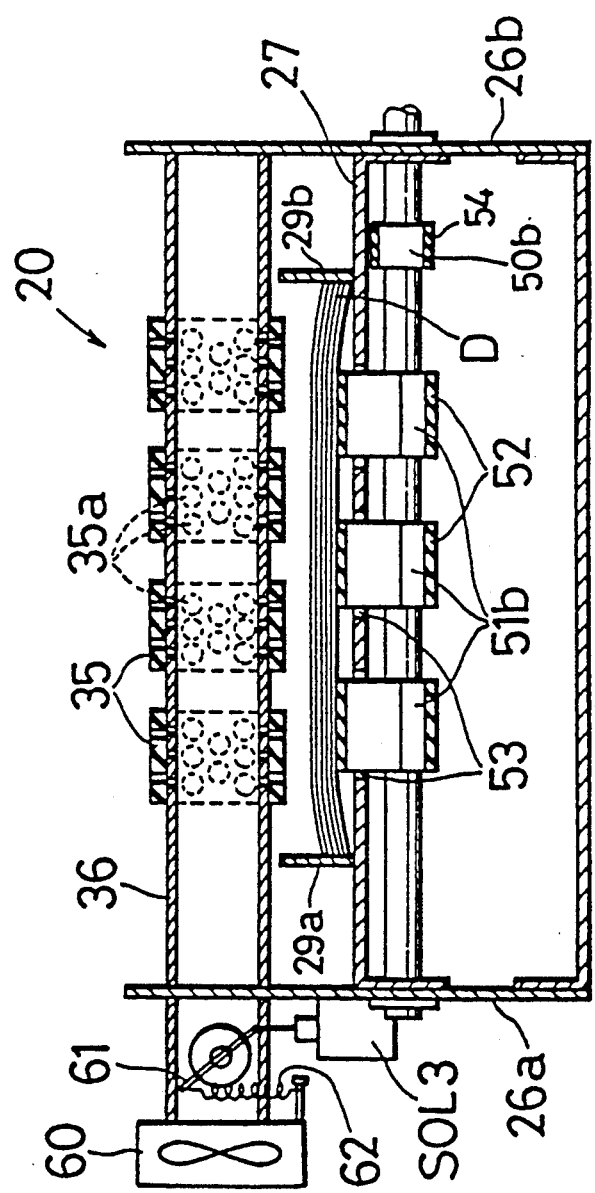
FIG. 8 is a sectional view seen from sectional line V—V in FIG. 5.

FIG. 5 is a sectional view showing the paper feeding operation of the documents D in the recirculating original feeding means 20, FIG. 6 is a sectional view seen from sectional line IV—IV in FIG. 5, FIG. 7 is a sectional view showing the restoring operation of the documents D in the recirculating original feeding means 20, and FIG. 8 is a sectional view seen from sectional line VI—VI in FIG. 7. Meanwhile, the same or corresponding parts as those in FIG. 4 are indicated by the same reference numbers. Referring then to FIG. 5 to FIG. 8, the operation of paper feeding and restoring in the recirculating original feeding means 20 in FIG. 3 is explained below.

When the position of the side aligning piece 30 of the storing means 21 is set, the documents D are mounted and the starting operation is effected, the paper feeding operation is started as shown in FIG. 5. Air is blown from the exhaust duct 32 to the right side of the documents D mounted in FIG. 5, that is, at the entire surface of the downstream side end portion in the paper feeding direction, and the downstream side end portion in the paper feeding direction of the documents D is separated by the air layer. At this time, as shown in FIG. 6, a fan 60 installed in the intake duct 36 in the paper feeding means 33 is driven, and by further demagnetizing a solenoid SOL3, stopped, by a spring force of a spring 62, a intake valve 61 is kept open, so that the air above the storing means is sucked in through the openings in the intake duct 36 and the openings 35a in the endless belt 35. Therefore, the document D0 at the uppermost position in the stacking direction of the stacked documents is pushed upward by the draft from the exhaust duct 32, and is sucked to the suction belt 35 by the suction action, and conveyance toward the conveying route which is not shown is started.

When the downstream end in the paper feeding direction of the sucked and conveyed document D0 reaches the conveying roller 37 at the start opening of the conveying route, the fan 60 stops, the solenoid SOL3 is excited, and the intake valve 61 overcomes the spring force and is closed. Furthermore, the belt 35 is stopped, and the conveyed document D0 receives the conveying force only by the conveying roller 37, and the paper feed into the conveying route is started. After feeding of the document, when reaching a predetermined timing, the fan 60, the solenoid SOL3 and the belt 35 are put into operation again to feed the succeeding document.

Meanwhile, it is not necessary to stop the draft from the exhaust duct 32 at the predetermined timing, but it may be always blowing. For the sake of convenience, in FIG. 7 and FIG. 8, it is shown that the draft is stopped at the time of restoring.

At the time of feeding of the documents D, only the paper feeding means functions, and the first restoring means 23, the second restoring means 25, and the driving member 24 do not contribute to the operation. That is, the solenoid SOL1 of the driving member 24 is demagnetized, and the lever piece 39a is disposed at the position shown in FIG. 5 by the spring force of the spring 45, and the plate part 46 is at a position remote from the first restoring means 23. Besides, in the second restoring means 25, the solenoid SOL2 is demagnetized, and the clutch CLT1 is not coupled, and the cam-shaped roller 51 is as shown in FIG. 5, and the outer circumferences 200a, 200b as the second portion at the shorter side from the rotary shaft are opposite the bottom surface side of the storing means, while the belt outer side of the belt 52 is positioned at the lower side of the bottom part 27. Therefore, the outer circumference of the belt 52 is at a remote position, not contacting with the lower side surface of the lowermost position in the stacking direction of the stacked documents D.

Successively, the document restoring operation is explained below. When the document Di is conveyed completely on exposure region and is sent along the guide plate 47, the photo detector S1 disposed on the guide plate 47 detects that the document Di is conveyed onto the guide plate 47. When the downstream end in the restoring direction of the document Di is detected, the solenoid SOL1 of the driving member 24 is excited, and the moving piece 43 is attracted into the solenoid SOL1. Therefore, the lever piece 39 of the driving member 24 rotates about the fulcrum 40 from the state shown in FIG. 5 to the state shown in FIG. 7, and the end portion of the plate part 46 opposite the storing means moves along the top surface of the guide plate 47, and is positioned, as shown in FIG. 7, at the upper side in the stacking direction on the outer circumference of the roller 38. Therefore, at the above disposed position, the plate part 46 is securely inserted between the lowermost position in the stacking direction of the documents D stacked in the storing means 21 and the roller 38, along the whole range of the upstream side end portion in the restoring direction of the documents D.

In other words, the plate part 46 intervenes between the already stored documents D and the roller 38. Therefore, the conveyed document Di does not collide against the upstream side end portion in the restoring direction of the documents D already stored in stack, and repelling and mixing as shown in FIG. 2 (1), (2) may not occur. Hence, the conveyed document Di is securely inserted into the lowermost position in the stacking direction of the documents D already stored in stack.

The document Di to be inserted into the lowermost position in the stacking direction is pinched between the roller 38 and the plate part 46. Therefore, the rotating force of the roller 38 is transmitted to the document Di, thereby causing the document Di to be securely conveyed in the lowermost position in the stacking direction of the documents stored in the storing means 21.

When the upstream end in the restoring direction of the document Di to be restored is detected by the photo detector S1, the solenoid SOL1 of the driving member 24 is switched over to the demagnetized state. Therefore, the lever piece 39 receives the spring force and rotates, and the driving member 24 returns from the position shown in FIG. 7 to the position shown in FIG. 5. Afterwards, driving of the second restoring means 25 is started.

That is, the solenoid SOL2 is excited, and the clutch CLT1 is coupled, thereby causing the rotary shaft of the small roller 50a and the rotary shaft 49a to be coupled, and causing the rotation of the cam-shaped roller 51 to be started together with the small roller 50a. As the cam-shaped roller 51 rotates in the counterclockwise direction in FIG. 7, the outer circumferences 201a, 201b as the first portion of the longer side of the cam-shaped rollers 51a, 51b are disposed upward. Therefore, when stopping, as shown in FIG. 5, the belt outer circumference of the endless belt 52 is positioned at the lower side of the bottom surface 27 of the storing means 21, but along with the rotation of the cam-shaped roller 51, the belt outer circumference of the belt 52 moves to the upper side of the bottom surface 27, and contacts with the bottom side surface of the document Di conveyed along the lowermost position in the stacking direction of the stacked documents D.

As the cam-shaped roller 51 further rotates, the belt outer surface of the belt 52 moves in the direction of arrow 63, and the contacting document Di is conveyed into the restoring direction. At this time, since the belt outer surface conveys the document Di in action of like lifting, the conveying force is securely transmitted to the document Di, so that the document Di may be conveyed securely.

A restoring distance by one revolution of the cam-shaped roller 51 may be predetermined by the length corresponding to the arc of the cam-shaped roller 51. For example, this length is selected at an integer fraction of the total restoring distance. Therefore, with respect to the document Di conveyed by the roller 38, by rotating the cam-shaped roller 51 of the second restoring means 25 by one to several revolutions, the document Di may be securely conveyed to a desired position, that is, until the downstream end in the restoring direction of the document Di reaches the side aligning piece 30. Accordingly, restoring will not stop on the way due to lack of the conveying force. Incidentally, when restoring of the document Di is over, the clutch CLT1 is cut off, and the second restoring means 25 is set in waiting state.

Figure 9:
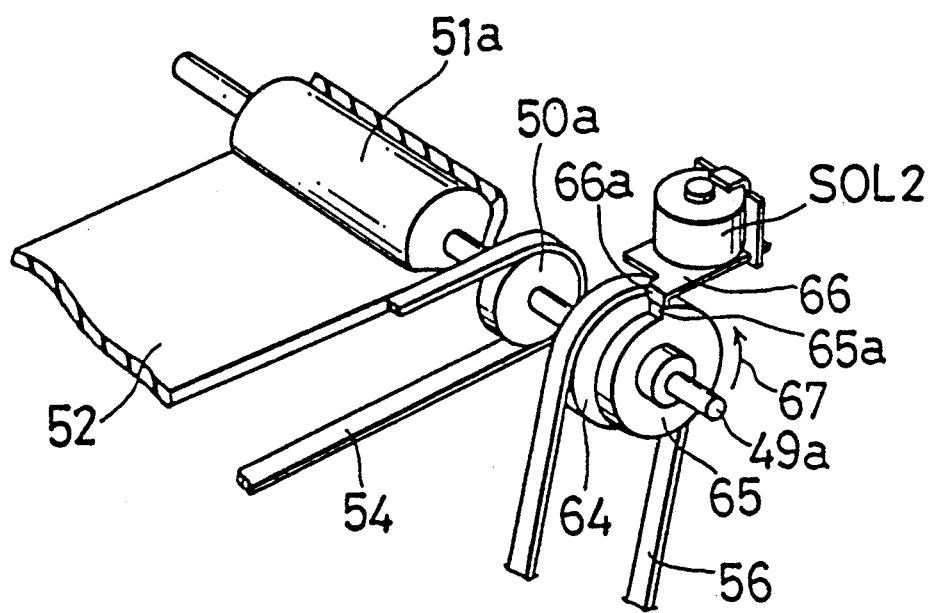
FIG. 9 is a perspective view showing a schematic structure near solenoid SOL2 of the second restoring means 25.

FIG. 9 is a perspective view showing a schematic structure around the solenoid SOL2 of the second restoring means 25. On the rotary shaft of the small roller 50a on which the belt 54 is applied, the cam-shaped roller 51a on which the belt 52 is applied is disposed. This rotary shaft is provided on the same axial line as the rotary shaft 49a of a gear 64, and is coupled and cut off by the clutch CLT1 which is not shown. This gear 64 and the roller driving motor M1 are coupled by means of belt 56.

On the rotary shaft 49a, there is a cam 65 of a nearly disc shape. The shape of the cam 65 is formed so that the diameter from the rotary shaft decrease gradually along the side surface, and one point on the side surface forms a stepped part for linking the maximum diameter and minimum diameter. Near the cam 65, there is a moving piece 66 of the solenoid SOL2, and a generally L-shaped protrusion 66a is formed at the leading end of the moving piece 66 and is designed to stop the stepped part.

Therefore, while the solenoid SOL2 is demagnetized, as the gear 64 rotates by driving the motor M1, the stepped part 65a of the cam 65 rotating in the direction of arrow 67 is stopped by the protrusion 66a of the moving piece 66, so that the rotation of the cam-shaped roller 51a is always stopped. On the other hand, when the clutch CLT1 which is not shown is coupled with and the solenoid SOL2 is excited, the protrusion 66a of the moving piece 66 is departed from the stepped part 65a of the cam 65, and the cam-shaped roller 51a rotates one revolution and is stopped again. Therefore, when the solenoid SOL2 is continuously excited, the cam-shaped roller 51a rotates several revolutions. In this structure, for example, driving of the second restoring means 25 is realized. This structure, however, is not limitative.

In this way, by driving of the second restoring means 25, since the belt outer circumference intermittently contacts with and departs from the surface of the document Di in the process of conveyance, the chance of the belt outer circumference abutting against the document Di may be limited, and extreme soiling of the documents experienced in the prior art may be lessened.

Therefore, according to the embodiment, by installing the driving member, repelling and mixing or other problems causing paper jamming can be avoided, and the document can be securely restored by the first restoring means, and further by using the second restoring means, the document can be conveyed to the final reaching position without contamination.

Figure 10:
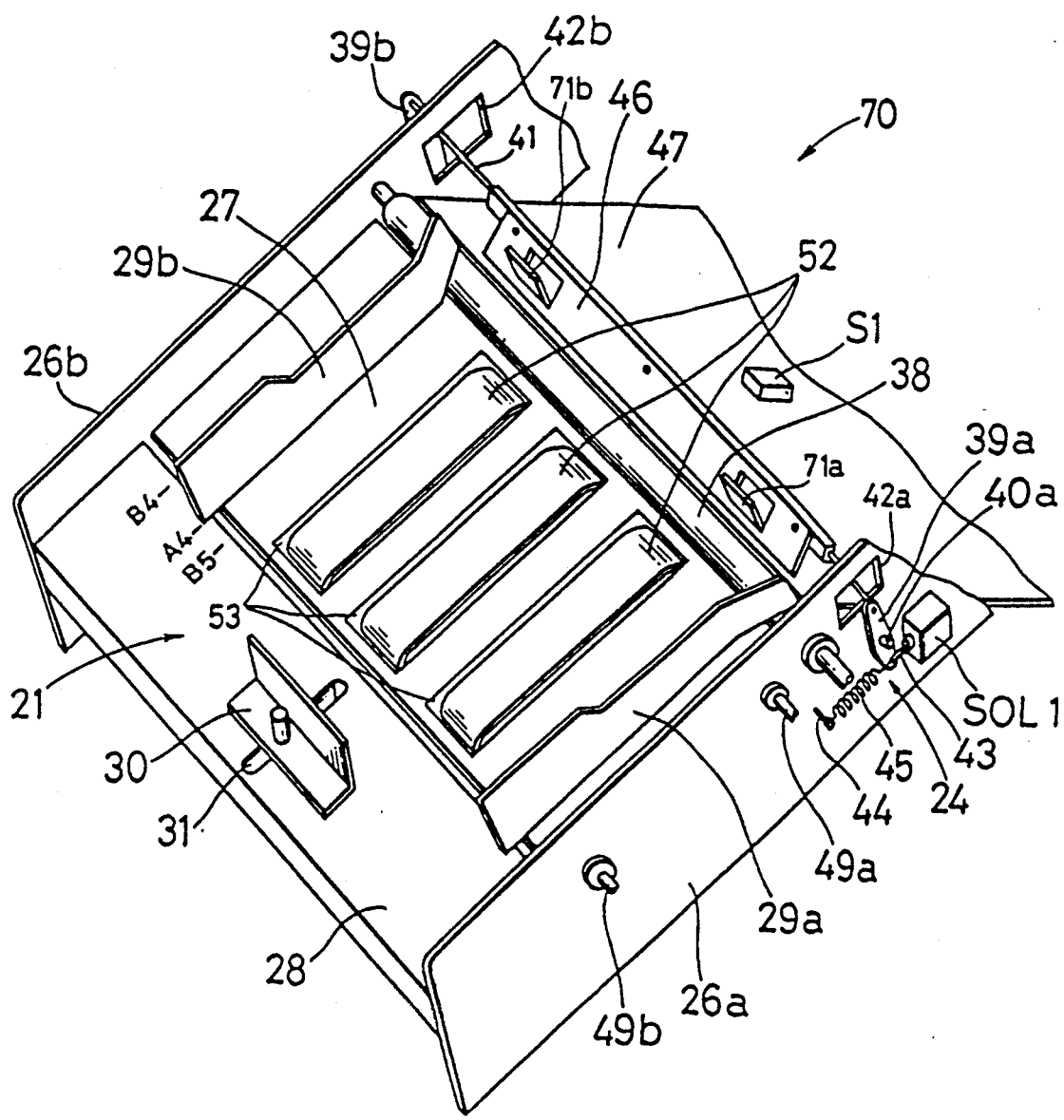
FIG. 10 is a perspective view showing a simplified structure of a recirculating original feeding means 70 in a second embodiment.
Figure 11:
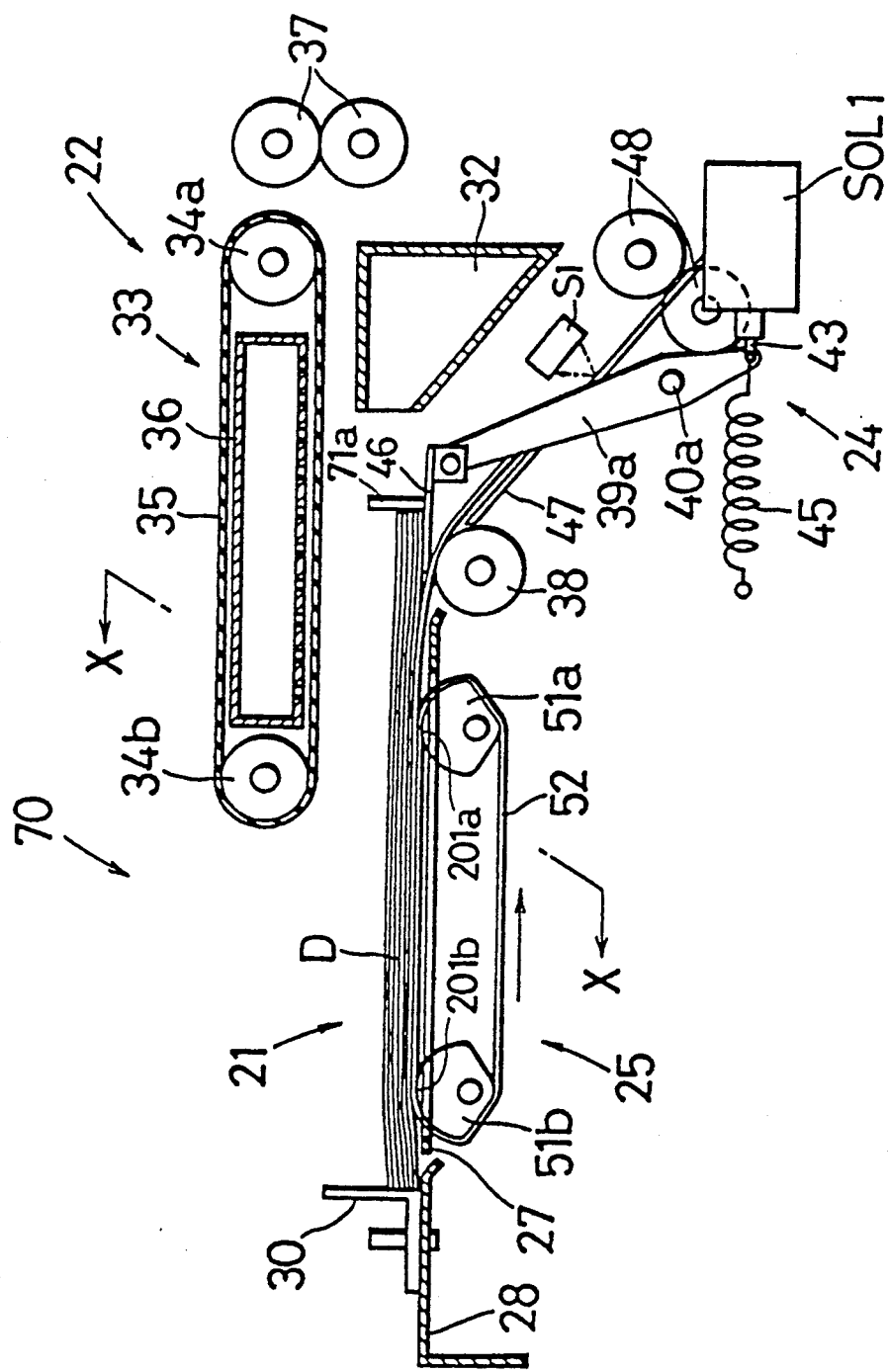
FIG. 11 is a sectional view showing the restoring operation of documents D in the recirculating original feeding means 70.
Figure 12:
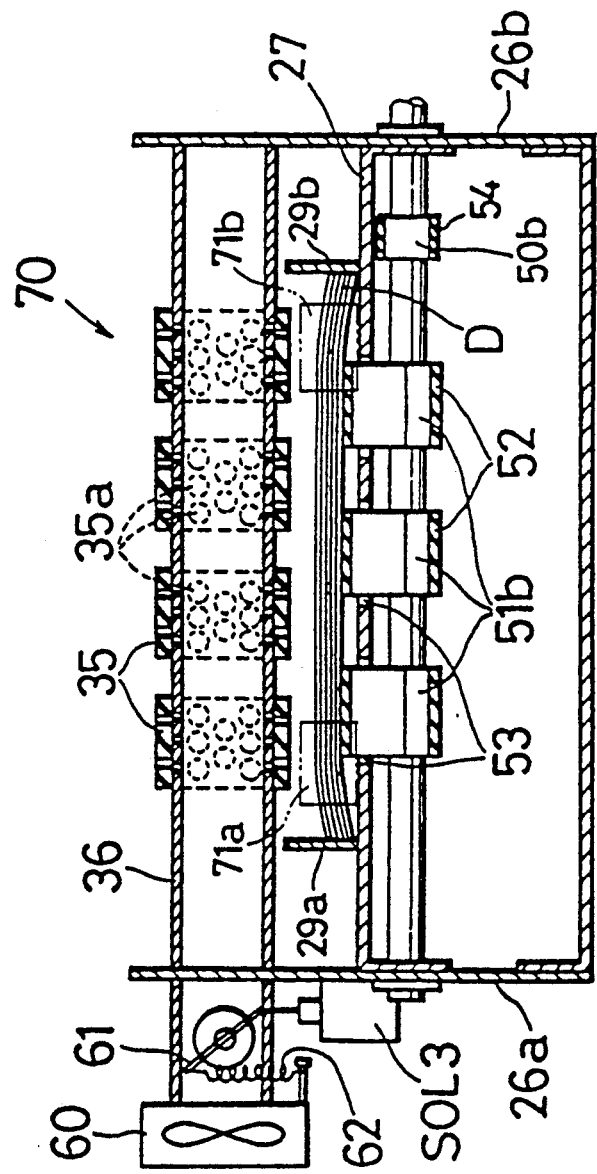
FIG. 12 is a sectional view seen from sectional line X—X in FIG. 11.

FIG. 10 is a perspective view showing a simplified structure of a recirculating original feeding means 70 in a second embodiment, FIG. 11 is a sectional view showing the restoring action of the documents D in the recirculating original feeding means 70, and FIG. 12 is a sectional view seen from sectional line X—X in FIG. 11. The same or corresponding parts as those shown in FIG. 1 to FIG. 6 are indicated by the same reference numbers.

The difference between the recirculating original feeding means 70 and the foregoing recirculating original feeding means 20 lies in the plate part 46 of the driving member 24. In the plate part 46 of the driving member 24 of the recirculating original feeding means 70, there are a plurality of (two in this embodiment) defining members 71 projecting almost vertically from the plate part 46. The defining members 71a, 71b are formed, in this embodiment, by cutting out three out of four sides to compose the square, and bending the other side along the shaft to project from the plane of the plate part 46, on the plane of the plate part 46, so that the projecting plane may be opposite to the entire surface of the upstream side end portion in the restoring direction of the stored documents D. The size may be, for example, about 1 cm square, and it is disposed near the both side end portions of the plate part 46. When selected at the above position, blowing of the draft from the exhaust duct 32 to the document is not impeded. The material may be other than the plate material (stainless steel, resin, etc.).

By forming such defining members, when the driving means 24 is driven at the time of restoration of the document Di as shown in FIG. 11, the upstream side end portion in the restoring direction of the documents D already stored in the stack may be pressed by the defining members. Therefore, the upstream side end portions in the restoring direction of the documents D can be uniformly refined and aligned at every restoring action of the documents D. By this defining, the draft from the exhaust duct 32 at the time of paper feeding is always blown uniformly to the entire surface of the upstream side end portion in the restoring direction of the documents D, so that each document can be securely separated by the air layer. Therefore, drooping of the upper-most document in the stacking direction so as not to be fed as shown in FIG. 2 (3), or oblique feeding can be securely prevented.

In order to obtain the effect by the defining members 71, it is not necessarily required to compose the second restoring means 25 in the structure as disclosed in the embodiment.

Besides, accurate feeding may be advantageously realized by other paper feeding means without including the suction conveying means as shown in FIG. 9.

Thus, according to the second embodiment, the same effects as in the foregoing embodiment may be obtained, and moreover by installing the defining members in the driving members, the upstream side end portion in the restoring direction of the documents D already stored in stack can be defined at every driving of the driving member, so that the paper feed can be accurate.

Figure 13:
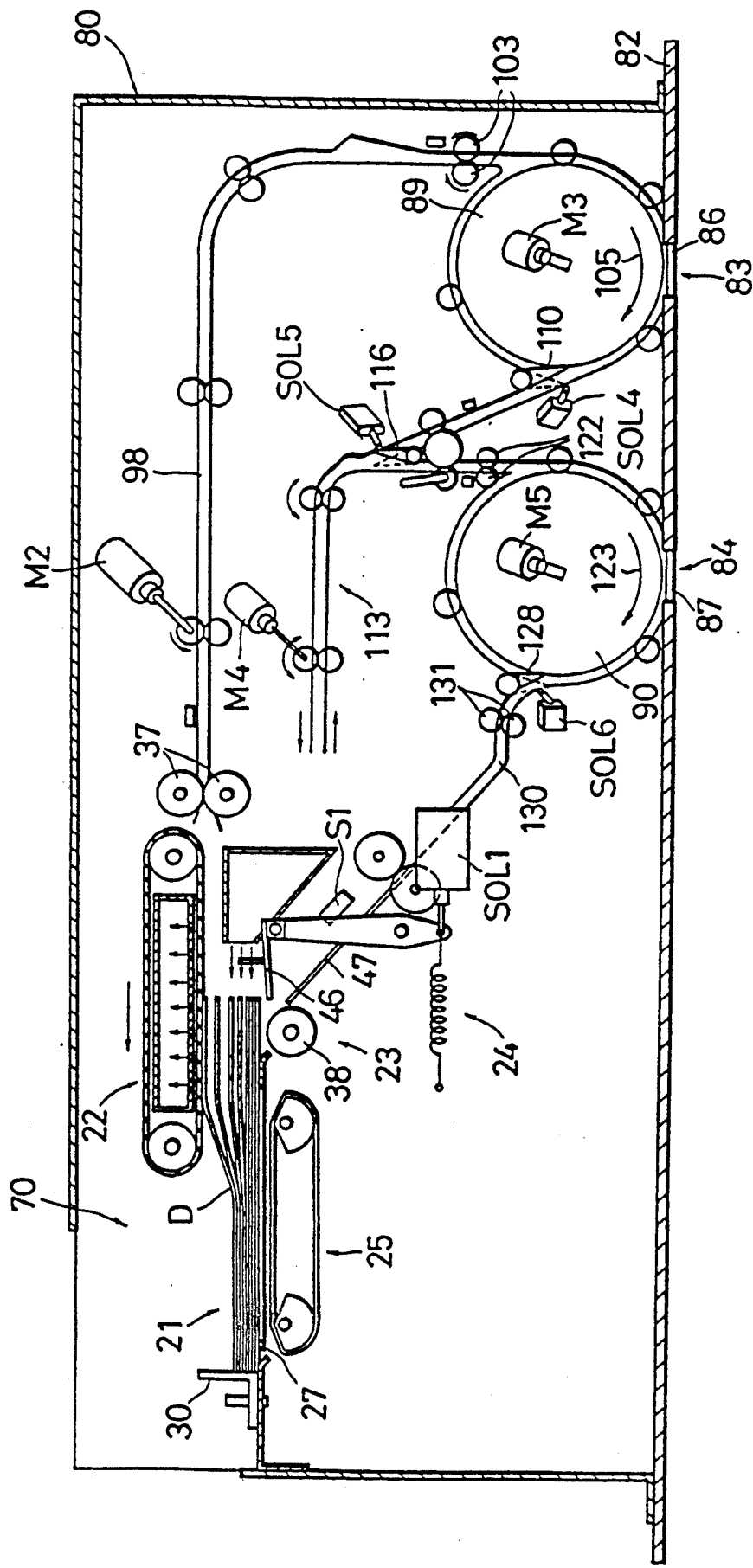
FIG. 13 is a sectional view showing a simplified structure of RADF 80 possessing the recirculating original feeding means 70.
Figure 14:
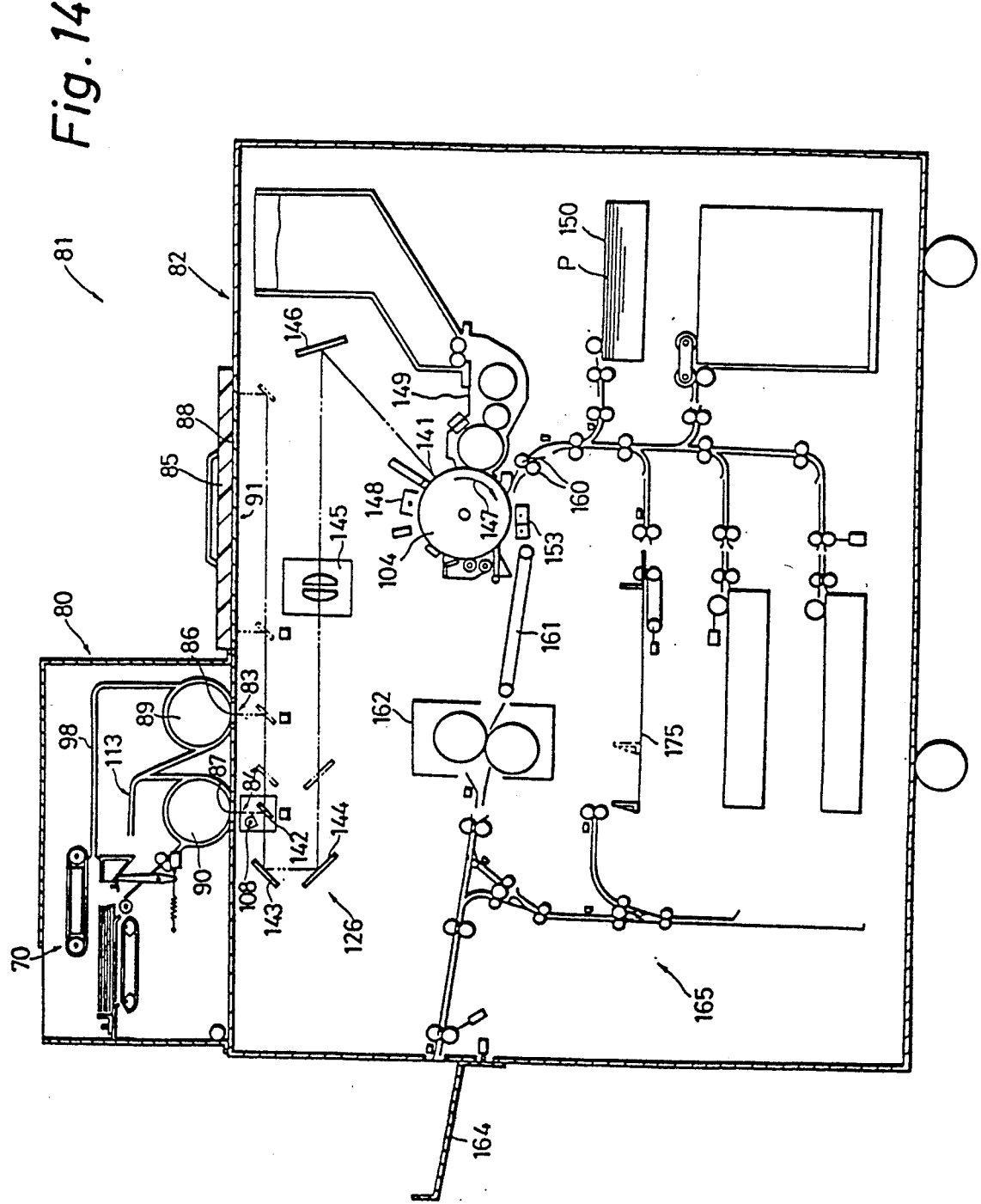
FIG. 14 is a sectional view showing a simplified structure of an electrostatic copying apparatus 81 having RADF 80.

FIG. 13 is a sectional view showing a simplified structure of the RADF 80 comprising the recirculating original feeding means 70, and FIG. 14 is a sectional view showing a simplified structure of an electrostatic copying apparatus having the RADF 80. Referring to FIG. 13 and FIG. 14, the structure of the electrostatic copying apparatus 81 having the recirculating original feeding means 70 of the invention is described below.

Above a main body 82 of the electrostatic copying apparatus 81, there is the RADF 80 for feeding the sheet documents D one by one to be read and exposed to a first exposure region 83 and a second exposure region 84 formed inside the upper part of the main body 82, and a pressure plate 85 for protecting the original images of bulky documents such as book from external light.

On the upper surface of the main body 82, a first transparent plate 86, a second transparent plate 87, and a third transparent plate 88 are disposed. The first transparent plate 86 is disposed in the lower part of a first support tube 89 in a right cylindrical form in the RADF 80, for the purpose of the first exposure region 83 for reading one surface of the documents D conveyed one by one. The second transparent plate 87 is disposed in the lower part of a second support tube 90 in a right cylindrical form in the RADF 80, for the purpose of the second exposure region 84 for reading the other surface of the documents D conveyed one by one. Furthermore, the third transparent plate 88 is disposed in the lower part of the pressure plate 85, for the purpose of a third region 91 for reading the copying surface of the stacked documents.

To copy the sheet document D, it is stacked and stored in the storing means 21 in the recirculating original feeding means 70 in the RADF 80 installed on the main body 82. The documents D stacked and stored in the storing means 21 are fed one by one from the uppermost one by the paper feeding means 22. The supplied document Di is conveyed into a conveying route 98 by means of the conveying roller 37 and plural rollers driven by a motor M2.

Near the first support tube 89 at the outlet of the conveying route 98, a pair of resist rollers 103 are disposed. A operating force transmitting means is coupled to the resist rollers 103 through a clutch CLT2 on the drive shaft which is not shown and rotation and stopping of the resist rollers 103 are controlled by the on/off control of the clutch CLT2. By the driving control of the resist rollers 103, the timing of conveyance of the documents D to the first support tube 89 is controlled. This control of conveying timing of the documents D is synchronized with the control of the timing of conveying a copying paper P onto a photosensitive drum 104 in the main body 82. Therefore, as stated below, the read surface of the document D is exposed by the photosensitive drum 104, and a toner image made sensible corresponding to the surface is transferred onto the copying paper P by controlling the timing appropriately.

Suction ports are disposed on the first support tube 89, for example, on its outer circumference, and a suction means which is not shown is connected inside the first support tube 89. By the function of this suction means, the conveyed document Di is attracted tightly. The first support tube 89 is driven by a motor M3 in the direction of arrow 105, and the document Di attracted to the first support tube 89 passes through above the first transparent plate 86. IN order to read one surface of the passing document Di, light is emitted to one surface of the document Di (to the upper surface of the document D stacked up in the storing means 21 in FIG. 13) faced to the first transparent plate 86 from the exposure lamp 108 (see FIG. 14), so that reading and exposure action may be effected.

The document Di of which one side has been read above the first transparent plate 86 passes through a direction converting pawl 110 which is changed over by a solenoid SOL4, and is conveyed into a document inverting means 113. At the document inverting means 113, the conveying direction of the conveyed document Di is inverted by a direction converting pawl 116 changed over by a solenoid SOL5 and conveying rollers which are rotated normally and reversely by the driving of a motor M4, and afterwards the document Di is conveyed into the second support tube 90 through a pair of resist rollers 122 which is controlled by the similar means as in the foregoing resist rollers 103.

The structure of the second support tube 90 is the same as that of the first support tube 89, and it attracts the conveyed document Di by the function of the suction means as stated above. The second support tube 90 is driven in the direction of arrow 123 by a motor M5, and the document Di attracted on the second support tube 90 passes through above the second transparent plate 87. Since the displaying side of the document has been inverted after passing through the document inverting means 113, the surface of the document Di faced to the second transparent plate 87 is the other surface that has not been read yet (the lower side of the document D stacked up in the storing means 21 in FIG. 13). To read this other surface, an optical system 126 including the exposure lamp 108 (see FIG. 14) is moved from the first exposure region 83 to the second exposure region 84. From the exposure lamp 108, light is emitted to the other surface of the document Di faced to the second transparent plate 87, so that reading and exposure action is effected.

The document Di of which other surface has been read above the second transparent plate 87 passes through a direction converting pawl 128 which is changed over by a solenoid SOL6, and is conveyed into a conveying route 130, and is sent further into the recirculating original feeding means 70 by a pair of conveying rollers 131.

When the photo detector S1 is changed over to an ON state by the downstream end in the conveying direction of the document Di being conveyed into the guide plate 47 through the conveying route 130, as mentioned above, the solenoid SOL1 is excited, and the plate part 46 of the driving member 24 is disposed on the outer circumference of the storing means side of the roller 38 which is the first restoring means 23. Therefore, the document Di is securely inserted into the lowermost position in the stacking direction of the already stored document D, and is conveyed. When the upstream end in the conveying direction of the document Di being conveyed passes through the photo detector S1 and the photo detector S1 is changed to an OFF state, the solenoid SOL1 is demagnetized, and the plate part 46 is departed from the storing means side of the roller 38 to be set in waiting state. In succession, as mentioned above, the second sorting means 25 is driven, and the document Di is securely conveyed until the downstream end in the conveying direction of the document Di reaches the side aligning piece 30, and restoring is over. After restoring, the second restoring means is set in waiting state.

Thereafter, the sheets are sequentially supplied from the uppermost position in the stacking direction of the documents D stacked in the storing means 21 into the document conveying route, and after being conveyed into the exposure region, they are sequentially restored in the lowermost position in the stacking direction of the documents D in the storing means 21.

In this document conveying route, both sides of the document Di pass facing to the exposure regions, and are read and exposed. The time of reading and exposing in the exposure regions 83, 84, 91, the optical system 126 is moved by a moving means which is not shown, and a moving element supporting the exposure lamp 108 is brought also into the exposure regions 83, 84, 91, respectively. In the exposure regions 83, 84, 91, when the light of the exposure lamp 108 is emitted to the surface of the document to be read, the reflected light from the document surface is focused on a exposure region 141 on the photosensitive drum 104 through optical path 140 by means of the optical system 106. The optical system 126 comprises the exposure lamp 108, reflector mirrors 142, 143, 144, a zoom lens 145 and a reflector mirror 146.

The photosensitive drum 104 driven in the direction of arrow 147 is first charged by a main corona discharger for charging 148. Next, as mentioned above, the image corresponding to the surface of the document read in the exposure regions 83, 84, 91 is focused on the exposure region 141, and an electrostatic image corresponding to the surface of the document is formed. The formed electrostatic image is made sensible into a toner image by a developing device 149. This toner image is transferred onto the copying paper P supplied from a cassette and controlled in the conveying timing by a pair of resist rollers 160, by means of a corona discharger for transfer 153. The rotation of the resist rollers 160 is controlled together with the resist rollers 103 in the RADF 80 and the resist rollers 122.

The copying paper P after transfer is conveyed into a fixing device 162 by a conveying means 161, and is fixed. In the case of simplex copy on the copying paper P, the fixed copying paper P is discharged into a discharge tray 164. In the case of duplex copy on the copying paper P, in order to copy on the other uncopied surface, the copying paper P is not discharged into the discharge tray 164, but is discharged into an intermediate tray 175 through a copying paper inverting means 165. The copying paper P stored in the intermediate tray 175 is supplied again, and is conveyed onto the photosensitive drum 104 by the resist rollers 160, and the other uncopied surface is copied. The copying paper P after duplex copy in this action is finally discharged into the discharge tray 164.

Figure 15:
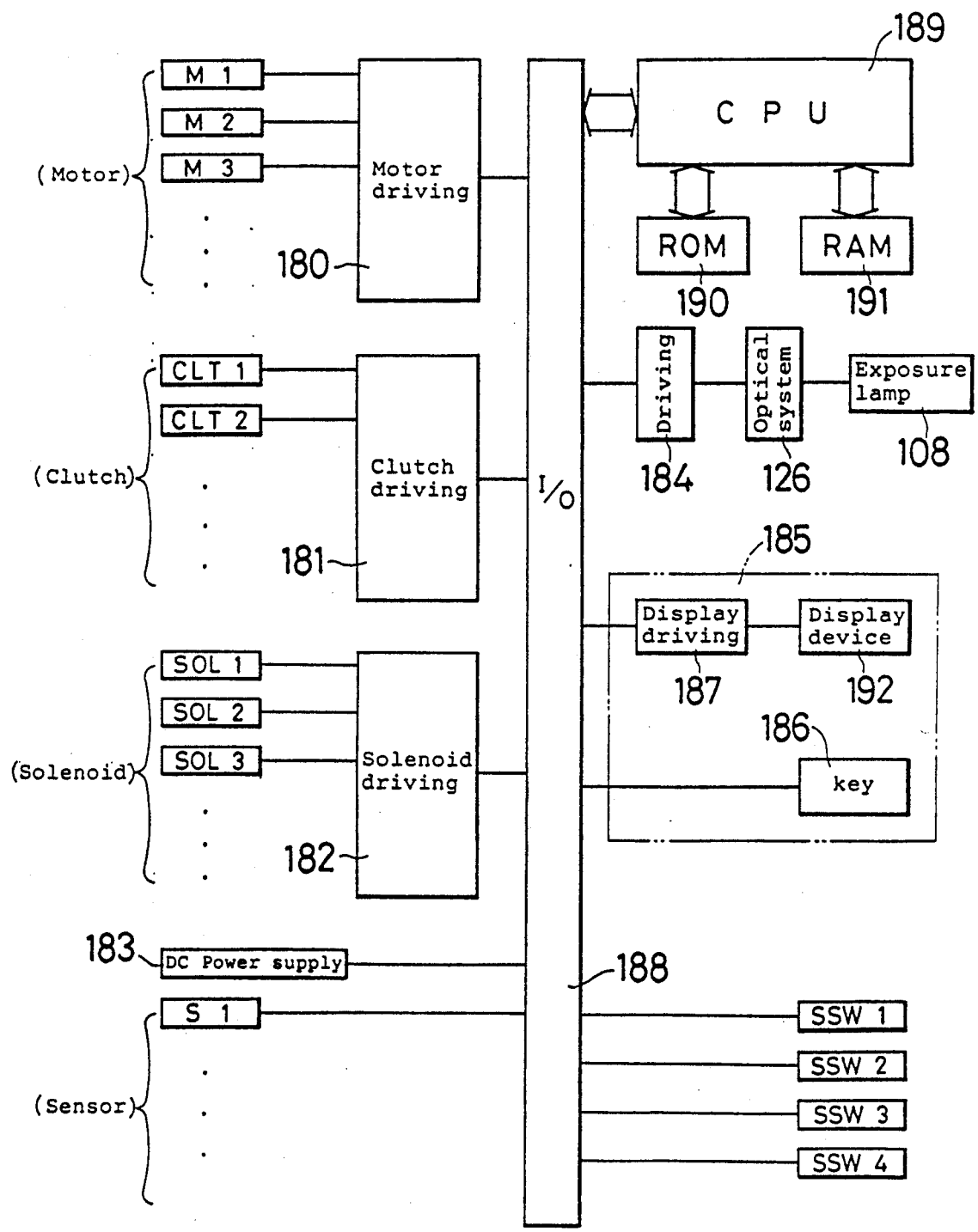
FIG. 15 is a block diagram showing an electrical composition of the electrostatic copying apparatus 81.

FIG. 15 is a block diagram showing an electrical structure of the electrostatic copying apparatus 81. As mentioned above, the motors such as motors M1, M2, M3 for rotating the rollers and support tubes are connected to a motor driving circuit 180. The clutches for controlling the synchronism of conveyance between the documents D conveyed in the RADF 80 and the copying paper P conveyed in the main body 82 are connected to a clutch driving circuit 181. The solenoids such as SOL1 and SOL2 for actuating the direction converting pawls in the conveying route and the driving member are connected to a solenoid driving circuit 182. These driving circuits 180 to 182 are connected to an interface circuit 188 together with a DC power supply 183, detecting elements such as the photo detector S1 for detecting the conveying state of the documents D and copying paper P, an optical system driving circuit 184 for moving the optical system 126, keys 186 on an operation panel 185 installed on the main body 82, and a display driving circuit 187 for driving a display device on the operation panel 185.

The interface circuit 188 is connected with a central processing unit (CPU) 189 composed of microcomputer and others, and the detection signals from the detecting elements are sent out into the CPU 189, and the driving circuits 180, 181, 182, 184, 187 are controlled depending on the control signals from the CPU 189. The CPU 189 is connected to a read only memory (ROM) 190 and a random access memory (RAM) 181, and according to the control program preliminarily stored in the ROM 190, the CUP 189 controls the copying operation. The RAM 191 is used as the calculation region of the counter and timer necessary, for example, for control of copying operation.

Moreover, the CUP 189 moves the optical system 126 by way of the interface circuit 188 and the optical system driving circuit 184, and controls lighting/extinguishing of the exposure lamp 108 in the exposure regions 83, 84, 91. Still more, a signal from the key k86 on the operation panel 185 is inputted in the CPU 189 through the interface circuit 188, and the process of copying operation or the like is displayed on the display device 192 on the operation panel 186 through the display driving circuit 187. The interface circuit 188 is connected with select switches SSW1 to SSW4 for selecting the copying mode in the RADF function. The selectable methods of copying are, for example, simplex copy from simplex document, duplex copy from simplex documents, simplex copies from duplex document, and duplex copy from duplex document.

According to the embodiment herein, by installing the driving member, paper jamming phenomena such as repelling and mixing of documents can be avoided, and the conveying force of the first restoring means can be securely transmitted to the document and the document can be restored into the storing means without fail. Besides, by installing the second restoring means for intermittently contacting to or departing from the restored document, the document can be securely conveyed to the predetermined final position. Furthermore, because of conveyance by such intermittent contact, soiling of document can be outstandingly reduced. Moreover, by installing defining members in the driving member, the upstream side end portion in the restoring direction of the documents already stored in the stack can be defined when driving the driving member, so that the paper can be fed accurately.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A recirculating feeder of sheets having storing means for storing a stack of sheets, for supplying the sheets from an upper side in a stacking direction and for restoring the sheets supplied from a downstream side in the stacking direction, the recirculating feeder comprising:

restoring means being disposed near a lower end in the stacking direction of the storing means near an upstream side in a restoring direction of the storing means for conveying the sheets into the storing means upon returning of the sheets; and a driving member being disposed at the upstream side in the restoring direction relative to the restoring means, the driving member being set closer to the stacking direction of the restoring means when the sheet is close to the restoring means when restoring the sheets, otherwise the driving member is set further from the restoring means, the driving member comprises;

a rotatable lever piece, a drive unit for rotating and driving the lever piece, and a plate part slidable in response to rotation of the lever piece, the plate part being inserted between the sheet and the restoring means when approaching the restoring means.

2. A recirculating feeder of sheets having storing means for storing a stack of sheets, for supplying the sheets from an upper side in a stacking direction and for restoring the sheets supplied from a downstream side in the stacking direction, the recirculating feeder comprising:

first restoring means being disposed near a lower end in the stacking direction of the storing means near an upstream side in a restoring direction of the storing means for conveying the sheets into the storing means upon returning of the sheets;

a driving member being disposed at the upstream side in the restoring direction relative to the first restoring means, the driving member being set closer to the stacking direction of the first restoring means when the sheet is close to the first restoring means when restoring the sheets, otherwise the driving member is set further from the restoring means; and second restoring means being disposed at the downstream side in the restoring direction relative to the first restoring means, for intermittently contacting and disengaging the sheets when restoring the sheets, and for conveying the sheets to the downstream side in the restoring direction during contact therewith, the second restoring means comprising:

a receiving member having a generally horizontal support surface for receiving sheets, and a hole defined therein extending along a conveying direction, a pair of rotating pieces being disposed rotatably around a generally horizontal rotary axial line beneath the receiving member, and arranged with a spacing along the conveying direction, in which the outer circumference of each of the rotating pieces has a first portion longer in distance from the rotary axial line and a second portion shorter in distance from the rotary axial in than in the first portion, and the outer circumference shape of each rotating piece is generally the same, a belt applied on the pair of the rotating pieces and which is projectable upwardly from the hole for projection, and driving means for rotating and driving the pair of rotating pieces in synchronism, thereby moving the outer circumference of the belt higher than the support surface when the first portion of each rotating piece is simultaneously positioned higher than the rotary axial line, and moving the outer circumference of the belt lower than the support surface when the second portion of each rotating piece is simultaneously positioned higher than the rotary axial line.

3. The recirculating feeder of sheets as claimed in claim 2, wherein the driving member has a defining member which projects to the upper side in the stacking direction of sheets, and presses the upstream side end portion in the restoring direction of sheets stacked in the storing means when approaching the first restoring means.

4. The recirculating feeder of sheets as claimed in claim 2, wherein the first restoring means comprises a roller.

5. The recirculating feeder of sheets as claimed in claim 2, wherein the driving member comprises:
 a rotatable lever piece,
 a drive unit for rotating and driving the lever piece, and
 a plate part slidable in response to rotation of the lever piece, the plate part being inserted between the sheet and the first restoring means when approaching the first restoring means.

6. The recirculating feeder of sheets as claimed in claim 2, further comprising detecting means for detecting the sheets conveyed into the first restoring means, and wherein the driving member responds to output from the detecting means, the driving member moves closer to the first restoring means while the detecting means is detecting the sheet, and the driving member moves away from the first restoring means while the detecting means fails to detect the sheet.

7. The recirculating feeder of sheets as claimed in claim 2, wherein the first portion of the rotating pieces is an arc possessing a generally uniform radius along a predetermined circumferential length about the rotary axial line in the shape of the outer circumference of the section generally at a right angle to the axis of the rotating piece.

8. The recirculating feeder of sheets as claimed in claim 7, wherein the circumferential length forming the arc of the rotating piece is selected as an integer fraction of a distance necessary for conveying the sheets in the storing means.

9. A recirculating feeder of sheets having storing means for storing a stack of sheets, for supplying the sheets from an upper side in a stacking direction and for restoring the sheets supplied from a downstream side in the stacking direction, the recirculating feeder comprising:

first restoring means being disposed near a lower end in the stacking direction of the storing means near an upstream side in a restoring direction of the storing means for conveying the sheets into the storing means upon returning of the sheets;

a driving member being disposed at the upstream side in the restoring direction relative to the first restoring means, the driving member being set closer to the stacking direction of the first restoring means when the sheet is close to the first restoring means when restoring the sheets, otherwise the driving means is set further from the restoring means, the driving member having a rotatable lever piece, a drive unit for rotating and driving the lever piece, and a plate part slidable in response to rotation of the lever piece, the plate part being inserted between the sheet and the first restoring means when approaching the first restoring means; and second restoring means being disposed at the downstream side in the restoring direction relative to the first restoring means, so as to convey the sheets to the downstream side in the restoring direction when restoring the sheets.

* * * * *